(12) United States Patent
Rye

(10) Patent No.: US 10,834,909 B1
(45) Date of Patent: Nov. 17, 2020

(54) LURE WITH CYCLICALLY PIVOTING FRAME

(71) Applicant: Ryan Patrick Rye, Lawrenceville, GA (US)

(72) Inventor: Ryan Patrick Rye, Lawrenceville, GA (US)

( * ) Notice: Subject to any disclaimer, the term of this patent is extended or adjusted under 35 U.S.C. 154(b) by 196 days.

(21) Appl. No.: 15/995,859

(22) Filed: Jun. 1, 2018

(51) Int. Cl.
*A01K 85/10* (2006.01)
*A01K 85/01* (2006.01)

(52) U.S. Cl.
CPC .............. *A01K 85/10* (2013.01); *A01K 85/01* (2013.01)

(58) Field of Classification Search
CPC ................................ A01K 85/10; A01K 85/14
USPC ................................................ 43/42.03, 42.11
See application file for complete search history.

(56) References Cited

U.S. PATENT DOCUMENTS

| | | | |
|---|---|---|---|
| 1,787,726 A | 1/1931 | Heddon et al. | |
| 2,294,082 A * | 8/1942 | Bradford | A01K 85/10 43/42.04 |
| 3,137,085 A * | 6/1964 | Swenson | A01K 85/14 43/42.36 |
| 3,143,824 A * | 8/1964 | Thomas | A01K 85/00 43/42.11 |
| 3,890,736 A * | 6/1975 | Worden | A01K 85/00 43/42.11 |
| 4,142,319 A * | 3/1979 | Mihaljevic | A01K 85/14 43/42.39 |
| 4,619,068 A * | 10/1986 | Wotawa | A01K 85/00 43/42.11 |
| 4,827,660 A * | 5/1989 | Dudeck | A01K 85/00 43/42.11 |
| 5,022,177 A * | 6/1991 | Gibson | A01K 85/00 43/42.09 |
| 5,381,621 A * | 1/1995 | Fuller | A01K 85/00 43/42.11 |
| 5,647,163 A * | 7/1997 | Gorney | A01K 85/00 43/42.13 |
| 5,857,284 A * | 1/1999 | Gunderson | A01K 85/00 43/42.11 |
| 6,266,914 B1 * | 7/2001 | Johnson | A01K 85/00 43/42.13 |
| 6,918,204 B1 * | 7/2005 | Trantham | A01K 85/01 43/42.11 |
| 7,627,978 B2 * | 12/2009 | Davis | A01K 85/02 43/42.03 |
| 7,726,062 B2 | 6/2010 | Davis | |
| 8,857,099 B1 * | 10/2014 | Hamrick, Jr. | A01K 85/00 43/42.11 |
| 9,003,690 B1 * | 4/2015 | Rye | A01K 85/12 43/42.15 |
| 9,072,285 B1 * | 7/2015 | Rye | A01K 85/00 |
| 9,078,421 B1 | 7/2015 | Rye | |
| 2002/0148155 A1 * | 10/2002 | Pasley | A01K 85/10 43/42.49 |
| 2003/0145510 A1 * | 8/2003 | Kohigashi | A01K 85/00 43/42.13 |

(Continued)

*Primary Examiner* — Christopher P Ellis

(57) ABSTRACT

A fishing lure comprises a blade member pivotally coupled to a wire form member through only one mounting aperture. The wire form member is further coupled to a weighted member or a hook. When the lure is pulled forward, the wire form member exhibits a cyclically repeating swinging movement coinciding with cyclical impacts between the blade member and wire form member.

20 Claims, 11 Drawing Sheets

(56) References Cited

U.S. PATENT DOCUMENTS

| | | | |
|---|---|---|---|
| 2007/0277423 A1* | 12/2007 | Edwards | A01K 85/00 43/42.13 |
| 2008/0172924 A1* | 7/2008 | Thorne | A01K 85/00 43/42.47 |
| 2009/0211145 A1* | 8/2009 | Thorne | A01K 85/00 43/42.39 |
| 2010/0281756 A1* | 11/2010 | Lau | A01K 85/00 43/42.13 |
| 2014/0033601 A1* | 2/2014 | Moran, Jr. | A01K 85/14 43/42.39 |
| 2015/0007483 A1* | 1/2015 | Thorne | A01K 85/00 43/42.03 |
| 2016/0235049 A1* | 8/2016 | Thorne | A01K 85/14 |
| 2017/0099822 A1* | 4/2017 | Thorne | A01K 85/00 |
| 2020/0060248 A1* | 2/2020 | Choate | A01K 85/08 |

* cited by examiner

LURE WITH CYCLICALLY PIVOTING FRAME

BACKGROUND INFORMATION

Common in-line spinner lures feature a metal wire or swivel passing through an opening in a blade member. The blade member either spins continuously around the metal wire, or the blade member spins continuously behind the swivel connection. A baitfish does not swim in such a barrel-roll or spiraling path. A more effective lure would utilize a blade member that drives rhythmically alternating, or cyclical, rotations of the wire form member of the lure, better replicating the repeating rocking or swinging movements of a wounded or dying minnow.

SUMMARY OF THE INVENTION

A fishing lure comprises a blade member loosely coupled to a wire form member. A first section of the wire form member passes through an aperture in the blade member, while a second section of the same wire form member prevents more than 360-degree rotation of the blade member around the first section of the wire form member. The wire form member may have a looped portion located at one end and a weighted member coupled to the opposite end. An eyelet is located between the looped portion and weighted member for the attachment of a fishing line thereto. As the lure is pulled forward in water, the blade member rotates in a first rotational direction and helps drive the wire form member sideways in the same rotational direction. A resistance to this sideways movement builds in the wire form member as a result of the combination of the fishing line pulling on the eyelet and the presence of the weighted member at the end of the second leg. Having its own rotational momentum, the blade member continues to spin until it strikes the looped portion. After this impact, the blade member and wire form member both spin in the opposite rotation direction. This opposite half-cycle movement continues until the blade member again strikes the looped portion, and both the wire form member and blade member then repeat the original half-cycle movement. This automatic and rhythmic cyclical rotation of the wire form member continues as the lure is pulled forward. The back and forth pivoting of the wire form member coupled with its side-to-side translation help create the illusion of an injured or wounded baitfish that is twitching or rocking back and forth.

REFERENCE NUMERALS

Figure 1A:
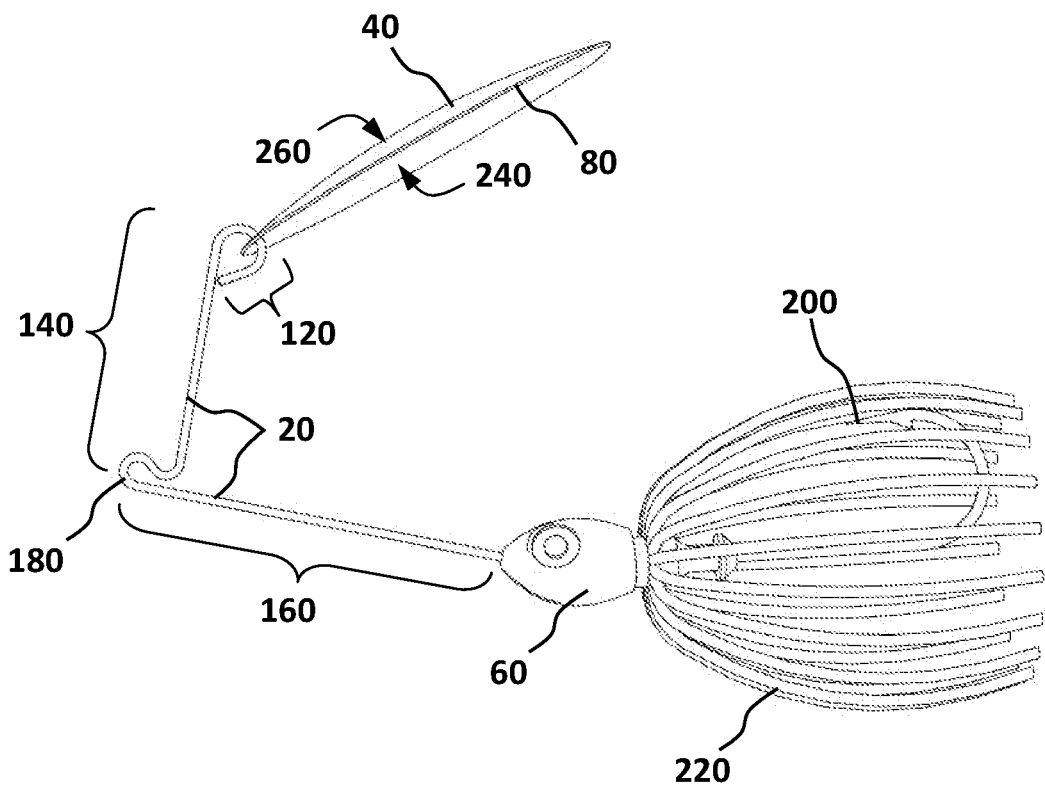
FIG. 1A is a diagrammatic perspective view of a first preferred embodiment of a lure with cyclically pivoting wire form member, in accordance with the present invention.
Figure 1B:
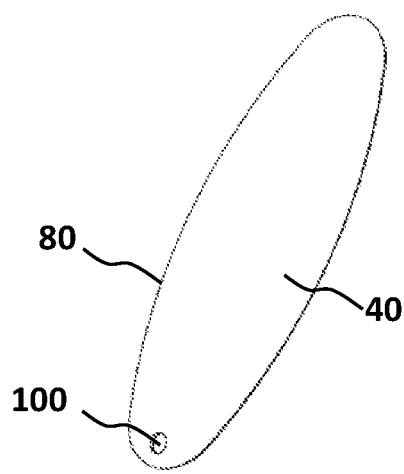
FIG. 1B is a diagrammatic perspective view of a blade member.

20 wire form member
40 blade member
60 weighted member
80 perimeter edge
100 aperture
120 looped portion
140 first leg
160 second leg
180 eyelet
200 hook
220 skirt
240 concave surface
260 convex surface
280 first section
300 second section
320 first leg axis
340 first direction rotation
360 opposite direction rotation
380 spin angle
400 aperture translation
420 eyelet translation
440 spacer member
460 terminal end
480 loop outline
500 first point
520 second point
540 segment
560 pivoting joint
580 second loop
600 jig hook eyelet
620 front-to-back direction

DETAILED DESCRIPTION OF PREFERRED EMBODIMENTS

FIG. 1A is a first preferred embodiment of a lure with cyclically pivoting frame comprised of a wire form member 20, blade member 40, and weighted member 60. FIG. 18 clearly shows the perimeter edge 80 of the blade member 40 and an aperture 100 that allows the blade member 40 to be loosely coupled to, and slidably constrained within, a looped portion 120 of the wire form member 20. It should be noted here that in this and all preferred embodiments, the wire form member 20 passes through the aperture 100 only once. That is, the wire form member 20 does not bend back and pass through the same aperture 100 a second time. In addition, it should also be noted that for the sake of this invention, the word "aperture" means any through-hole shape having a closed boundary. The wire form member 20 of any embodiment herein is simply a metal wire bent into any predetermined shape, and in this first embodiment the predetermined shape is comprised of a first leg 140 and a second leg 160, with the looped portion 120 located at the end of the first leg 140 and the weighted member 60 rigidly coupled to the second leg 160. An eyelet 180 or bend in the wire form member 20 is located between the first leg 140 and the second leg 160, and a fishing line or leader can be attached to the eyelet 180. A hook 200, ending in a hook point, extends rearward from the weighted member 60, and a skirt 220 or soft elastomeric trailer can be attached to the weighted member 60 to help disguise the hook 200. In this preferred embodiment, the wire form member 20 has a general "V" or "L" type shape, the first leg 140 is preferably shorter than the second leg 160, and ideally the first leg 140 is less than 50 mm in length to help amplify the swinging movement of the wire form member 20.

The blade member 40 of this particular embodiment comprises a first face having a concave surface 240 and an opposite face having a convex surface 260. For proper lure operation when a curved blade member 40 is used, the convex surface 260 generally faces the forward direction of lure travel. That is, when the lure is pulled forward underwater, the convex surface 260 is both generally facing and generally closer to the angler, while the concave surface 240 is both generally facing and generally closer to the weighted member 60 or hook 200. Mounting a curved blade member 40 in the opposite orientation causes the lure to undesirably spin uncontrollably underwater and does not create the extreme cyclical motion described herein. It is also obvious from FIG. 1A that the looped portion 120 of the wire form member 20 constrains the rotation of the blade member 40 to be less than 360 degrees around the wire form member 20. Said differently, the wire form member 20 cannot rotate or spin more than 360 degrees relative to the blade member 40.

Figure 2:
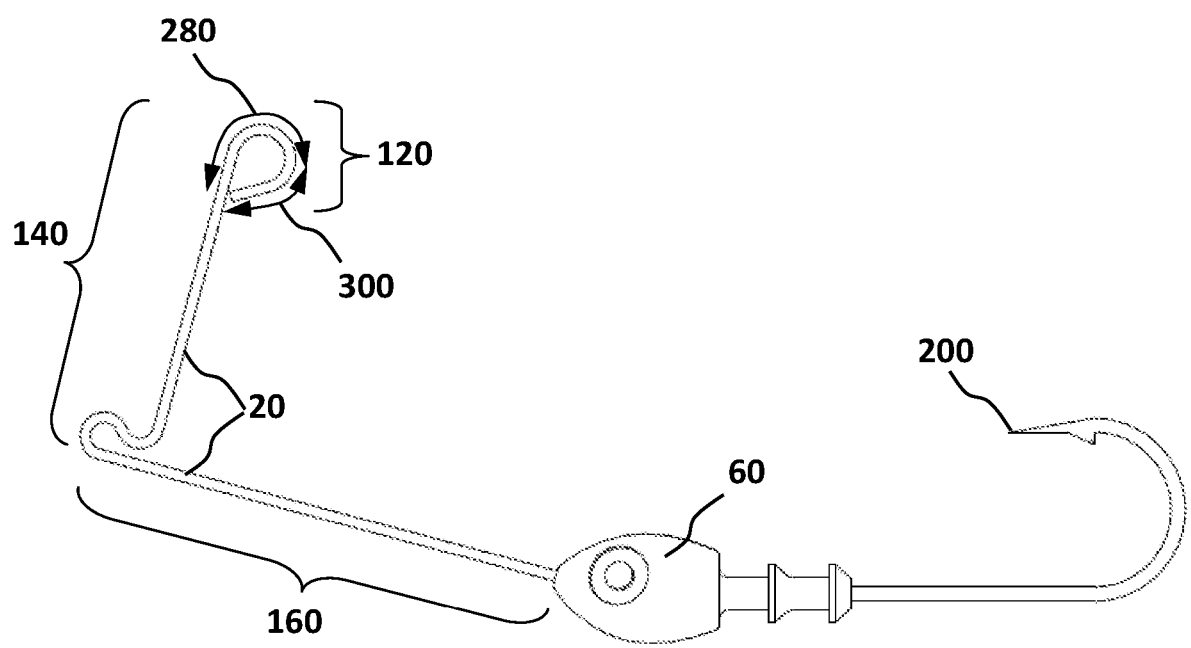
FIG. 2 is a diagrammatic side view of the first preferred embodiment with the skirt and blade member removed.

FIG. 2 is a side view of the same first preferred embodiment with the skirt 220 and blade member 40 removed. The looped portion 120 of the wire form member 20 can be divided into a first section 280 and a second section 300. The first section 280 of the looped portion 120 is the portion that the blade member 40 rotates about. The second section 300 of the same looped portion 120 serves as an impact region for the perimeter edge 80 of the rotating blade member 40 as it rotates around the first section 280. From FIG. 2, it is also obvious that the second section 300 of this embodiment is generally closer to the weighted member 60 than the first section 280.

Figure 3:
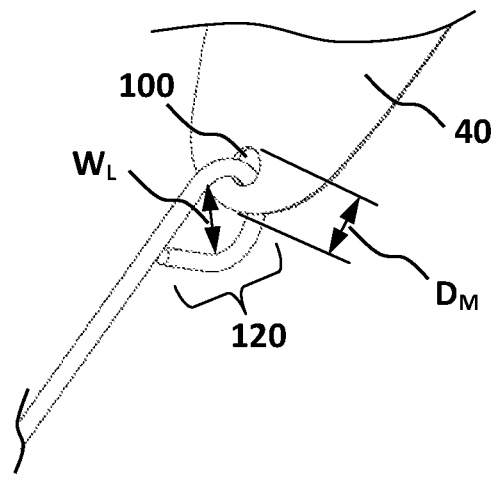
FIG. 3 is an enlarged diagrammatic perspective partial view of the blade member and looped portion of the wire form member.
Figure 4:
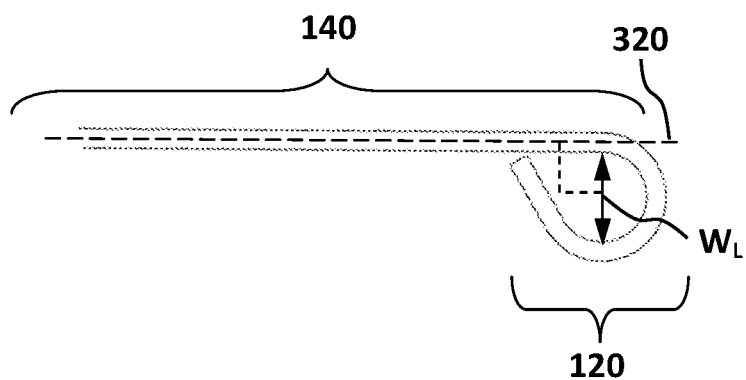
FIG. 4 is an enlarged diagrammatic partial side view of part of the first leg detailing the looped portion of the wire form member.

FIG. 3 is a partial enlarged view of a blade member 40 loosely attached to the looped portion 120. In order for proper operation of this embodiment, the minimum distance $D_M$ between the trailing edge of the aperture 100 and nearest tip of the blade member 40 should be less than the loop width $W_L$ of the looped portion. The loop width $W_L$ is defined as the distance across the opening of the looped portion 120 and is measured in a direction perpendicular to the first leg axis 320, as shown in FIG. 4. This geometric relationship ensures that the curved blade member 40 is free enough to pivot the large amount necessary to generate the desired swinging movement of the wire form member 20.

Figure 5A:
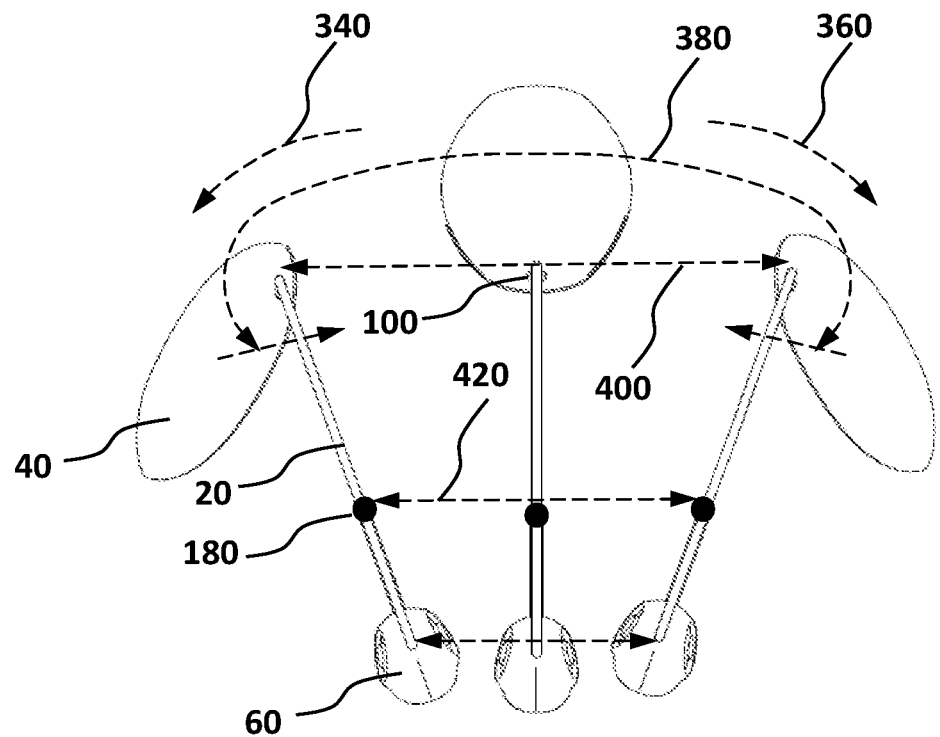
FIG. 5A is a diagrammatic front view illustrating the cyclical motion of the wire form member, with three images superimposed into the same view to help show the extreme swinging movement of the wire form member and movement of the blade member.
Figure 5B:
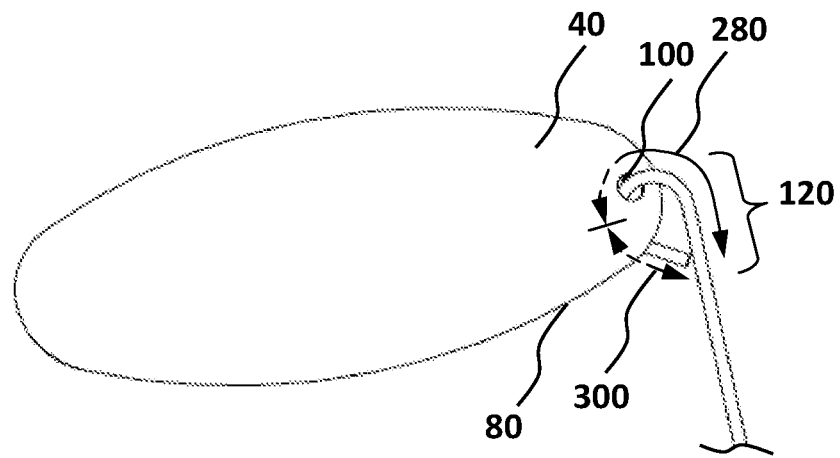
FIG. 5B is an enlarged diagrammatic partial view showing the blade member at the moment the blade member perimeter edge impacts the looped portion during blade rotation reversal.

FIG. 5A illustrates the extreme cyclical movement of the wire form member 20 of FIG. 2 by superimposing three snapshots in time onto a same front view, while FIG. 5B shows the moment the blade member 40 changes rotation direction by impacting the second section 300 of the looped portion 120. Water flowing past the curved blade member 40 causes the curved blade member 40 to arbitrarily start a first direction rotation 340, and this movement of the blade member 40 also pulls the wire form member 20 and weighted member 60 sideways and causes the wire form member 20 to rotate in the same direction as the blade member 40. The blade member 40 will continue to drive the rotation of the wire form member 20 and supply the force that pulls the fishing line and eyelet 180 towards one side until the tension in the fishing line and the ever-increasing downward rotation of the blade member 40 combine to slow further sideways movement of the wire form member 20. The more the wire form member 20 swings to one side, the more the tension in the fishing line will attempt to pull the eyelet 180 and wire form member 20 back into alignment with the retrieval direction center plane. The blade member rotation will temporarily stop when the perimeter edge 80 of the rotating blade member 40 strikes the second section 300 of the looped portion. The reaction force from this impact then causes the blade member 40 to begin an opposite direction rotation 360 until again the wire form member movement slows and the rotating blade member 40 again strikes the second section 300 of the looped portion 120. At each moment of impact with the looped portion 120, the blade member 40 is momentarily touching the wire form member at two locations: the aperture 100 touches the first section 280, and the perimeter edge 80 touches the second section 300. This cyclical back-and-forth rotation of the wire form member 20 will continue as long as the lure is pulled forward in water. Due to the repeating impacts of the blade member 40 and looped portion 120, the cyclical motion can also be characterized as the blade member 40 rhythmically contacting the looped portion 120 at one pivot location, then two locations (pivot and impact), then one location, then two locations, and so on in a repeating manner. All of this occurs while the lure remains in a generally upright position, which is characterized by the weighted member 60 remaining generally lower in the water than the blade member 40 during retrieval. A generally upright or generally stable orientation can also describe a movement in which the fishing line or hook does not rotate more than 360 degrees as the lure is pulled forward, such as the lure movement described in FIGS. 5A-5B.

It should be noted that for this and all other embodiments, no additional spinner or second blade attachment needs to be connected to the first blade via a swivel in order to drive the first blade's side-to-side motion. The blade member described herein has a swivel-less connection with adjacent lure components. Said differently, the blade member is solely connected to the wire form member and is not additionally connected to a second blade or other component via a swivel. No swivels are illustrated or required in the construction of the lure in order to generate the desired side-to-side motion of the wire frame.

It is important to note that the lure motion comprises both rotation and translation of the blade member 40. During any side-to-side half-cycle of the wire form member swinging movement, a substantially curved blade member 40 rotates through a spin angle 380 between 120 and 360 degrees, with the spin angle 380 depending on blade shape, aperture diameter, wire form member leg length, and size of the looped portion. Spin angle 380 of this embodiment is shown as the angle between the two normal vectors of the center of the concave surface of the blade member 40 in its extreme left-and-right orientations. This is unique since a wire form member rotation amount this large with no attaching swivel or rings would typically mean that a bladed lure would spiral around more than 360 degrees and spin uncontrollably underwater. In the present invention, repeating impacts of the curved blade member 40 onto the looped portion 120 cause the aperture 100 to undergo a side-to-side blade aperture translation 400 of at least one-half inch. That is, the blade member 40 translates an amount of one-half inch or more as the blade member 40 drives the wire form member 40 to pivot from side-to-side. A longer blade member 40 can help generate a swept aperture translation 400 of even one inch or more. The blade member 40 not only pivots about the looped portion 120, but the entire blade member 40 translates side-to-side by an extreme amount. An alternate way to characterize this movement is that the blade member aperture translation 420 is greater than the side-to-side eyelet translation 420 of the line-attaching eyelet 180. In turn, the eyelet translation 420 is greater than the side-to-side weighted member translation. Thus, the wire form member 20 undergoes both a cyclically repeating clockwise-then-counterclockwise rotation as well as a cyclically repeating side-to-side translation, and it is the combination of both this rotation and translation that give the lure its unique motion.

Figure 6:
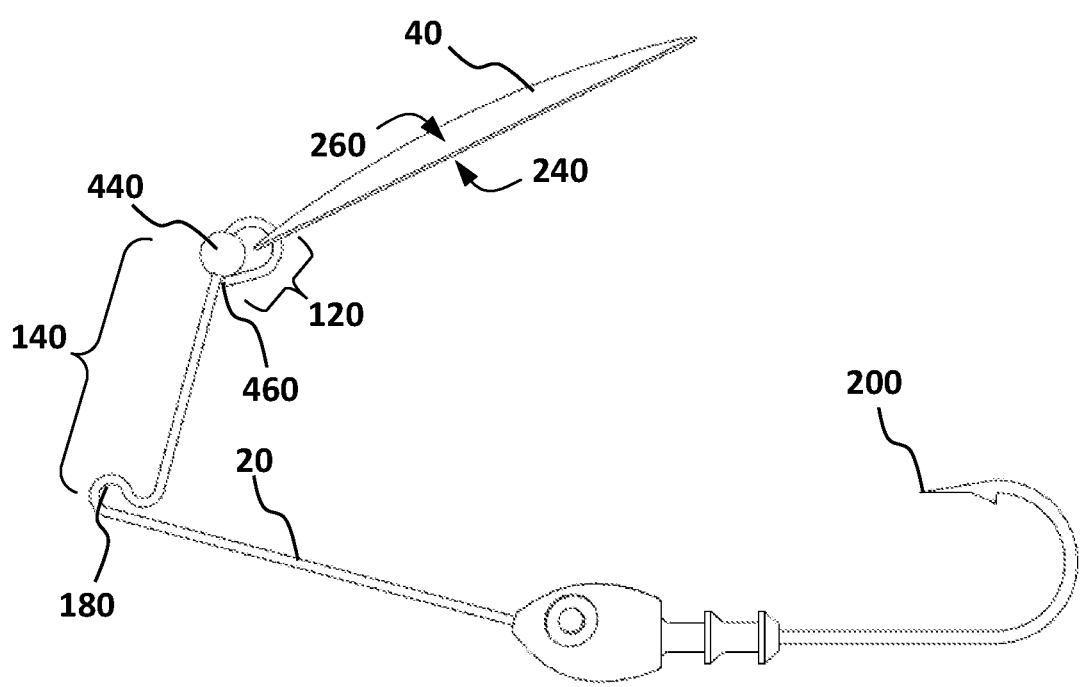
FIG. 6 is a diagrammatic perspective view of a second preferred embodiment wherein a spacer member is added between the convex surface of the blade member and the terminal end of the looped portion.

FIG. 6 is a second preferred embodiment of the lure and includes a spacer member 440 attached to the looped portion 120 of the wire form member 20. The spacer member 440 is positioned along the first section 280 of the looped portion 120, and the spacer member 440 is constrained along the first leg 140 by the terminal end 460 of the looped portion 120 and the convex surface 260 of the blade member 40. Although not shown, the spacer member 440 can also be constrained by a sharp bend in a leg such to be immediately adjacent to the convex surface 260 of the blade member 40 and at the beginning of a U-shaped looped portion. Regardless of how a spacer member 440 is constrained from sliding in a direction towards the eyelet 180, the presence of a spacer member 440 does not prevent this second embodiment of the lure from undergoing the same cyclical rotational and translational movements described by FIGS. 5A-5B. In this embodiment, the spacer member 440 is shown as a small bead, but it can be any shape, and it can be either rigidly or loosely coupled to the wire form member 20 or to the blade member 40. Without the spacer member 440, a blade member 40 of this preferred embodiment can become stuck to one side or tilt forward and not start rotating at all, as the spacer member 440 helps prevent the concave surface 240 of the blade member 40 from becoming stuck or jammed in a forward or sideways direction as the lure splashes into the water moments before retrieval.

There are additional desirable constraints for keeping this embodiment of the lure in a generally upright orientation while undergoing the extreme movements of FIGS. 5A-5B. In the embodiment of FIG. 6 where the blade member 40 has a substantially curved shape, it should be noted again that the concave surface 240 of the blade member 40 must be the side of the blade member 40 facing the hook 200 during normal lure operation. In other words, the blade member 40 should not be mounted in the opposite orientation with the concave surface 240 undesirably facing the sky or facing the forward direction of lure travel. Also, the hook point is located behind the blade member 40 such that the blade member 40 desirably occupies a region in space between the hook point and the eyelet 180. For more pronounced swinging movements of the wire form member 20, the diameter of the aperture in the blade member 40 should be less than three times the wire form member thickness. This can ensure more of a tighter free-sliding fit of the blade member 40 onto the wire form member 20 versus a large-aperture blade, which would result in the large-aperture blade having an extremely loose sliding fit onto the wire form member 20.

Figure 7:
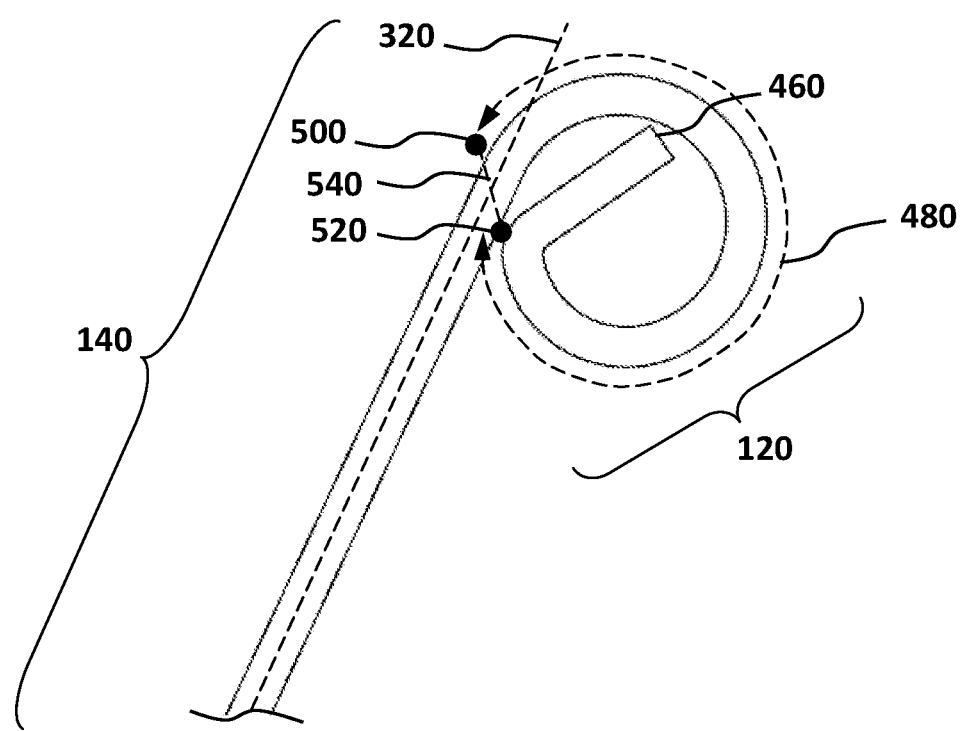
FIG. 7 is a diagrammatic perspective enlarged of an alternate shape of the looped portion, wherein the unique shape helps eliminate the need for a spacer member.

FIG. 7 shows an alternate embodiment wherein the shape of the looped portion 120 is modified such that a spacer member is not required. The terminal end 460 of the looped portion 120 is bent back to lie within the looped portion 120 itself. A blade member 40 having an aperture 100 far from the center of the blade is constrained from sliding more forward on the looped portion due to the shape of the wire near the terminal end 460. Said differently, the terminal end 460 of the looped portion 120 acts as a stop feature to keep a blade member 40 from resting in a significant forward-tilting or side-tilting position, which could otherwise prevent the cyclical movement of FIG. 5 from starting when the lure is first pulled forward.

In FIG. 7, the terminal end 460 lies within a loop outline 480 substantially defined by the looped portion 120. The first point 500 of the loop outline 480 starts near the initial curvature of the looped portion 120 where the looped portion 120 starts bending away from the first leg axis 320, and the loop outline 480 extends around the perimeter of the looped portion 120 to a second point 520 where the looped portion 120 again becomes adjacent with, or next to, the first leg 140. The loop outline 480 is then completed by an imaginary segment 540 that joins the first point 500 and second point 520. The sharp bend at the second point 520 allows the terminal end 460 to be located within the loop outline 480.

Figure 8A:
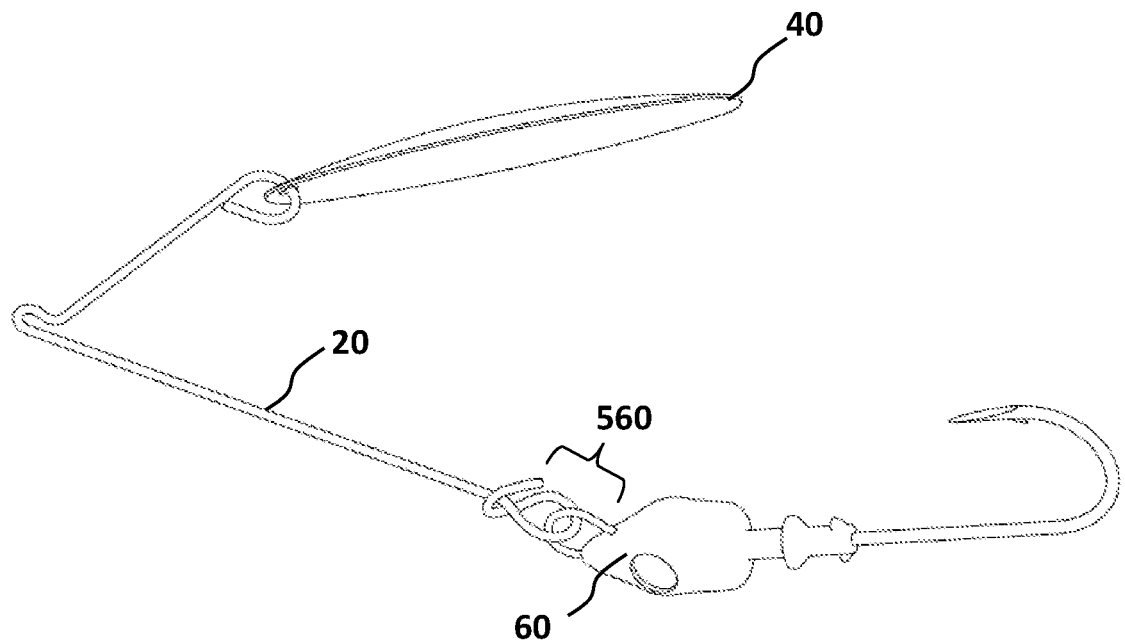
FIG. 8A is a diagrammatic perspective view of a third preferred embodiment wherein the weighted member and hook are loosely coupled to the wire form member.
Figure 8B:
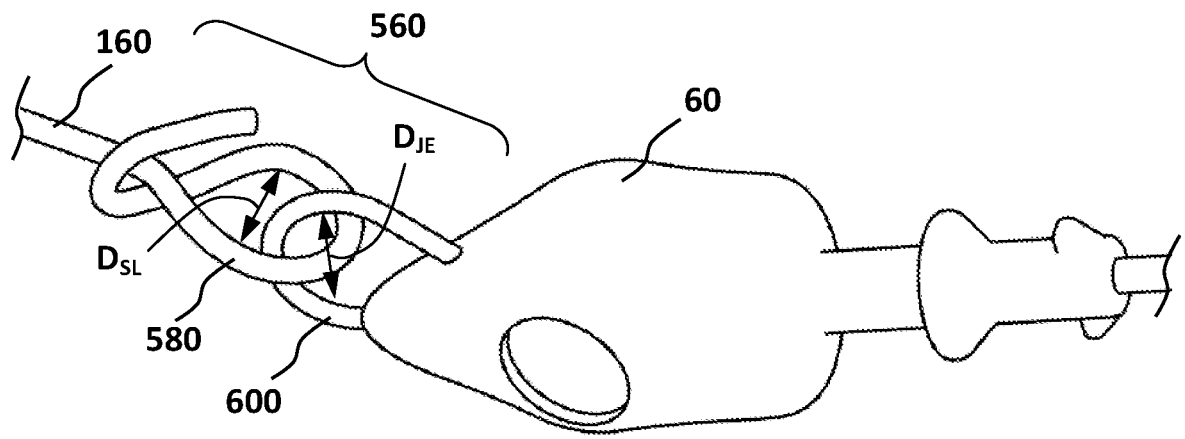
FIG. 8B is a diagrammatic perspective enlarged view of the pivoting joint of the third preferred embodiment.

FIGS. 8A-8B describe a third preferred embodiment wherein the weighted member 60 and hook 200 are loosely coupled to the wire form member 20 through a pivoting joint 560. Such an arrangement is a common means of attaching a pre-existing jig-type lure onto a pre-existing wire form member 20. The pivoting joint 560 comprises a second loop 580 at the end of the second leg 160 and a jig hook eyelet 600 extruding from the weighted member 60. For the desired level of wire form member pivot movement of this embodiment, the greatest distance $D_{SL}$ across the opening created by second loop 580 and the greatest distance $D_{JE}$ across the opening created by the jig hook eyelet 600 should each be 3 mm or larger.

Figure 9:
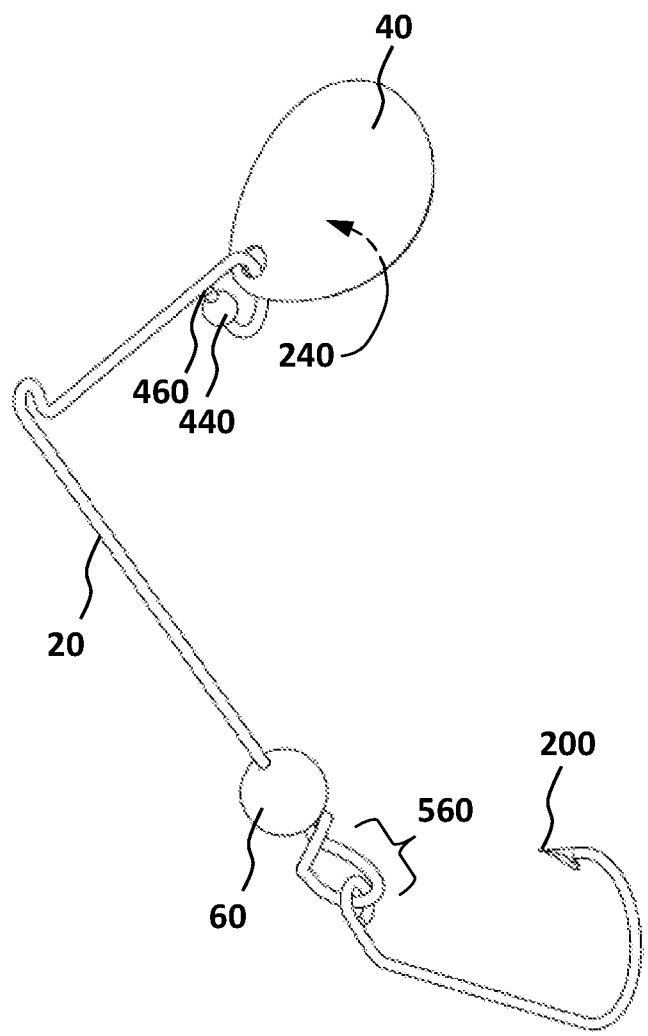
FIG. 9 is a diagrammatic perspective view of a fourth preferred embodiment wherein the hook is loosely coupled to the wire form member.

FIG. 9 shows a fourth preferred embodiment wherein the weighted member 60 is coupled to the wire form member 20, and the hook 200 is loosely coupled to the wire form member 20 through a pivoting joint 560. This arrangement can be more popular when using a pre-existing swimbait-type hook. Here a spacer member 440 is shown located along the second section 300 of the looped portion 120 between the terminal end 460 and the rearward-facing concave surface 240 of the curved blade member 40. This location of the spacer member 440 can help prevent thinner blade members from sliding off the looped portion 120 entirely.

Figure 10:
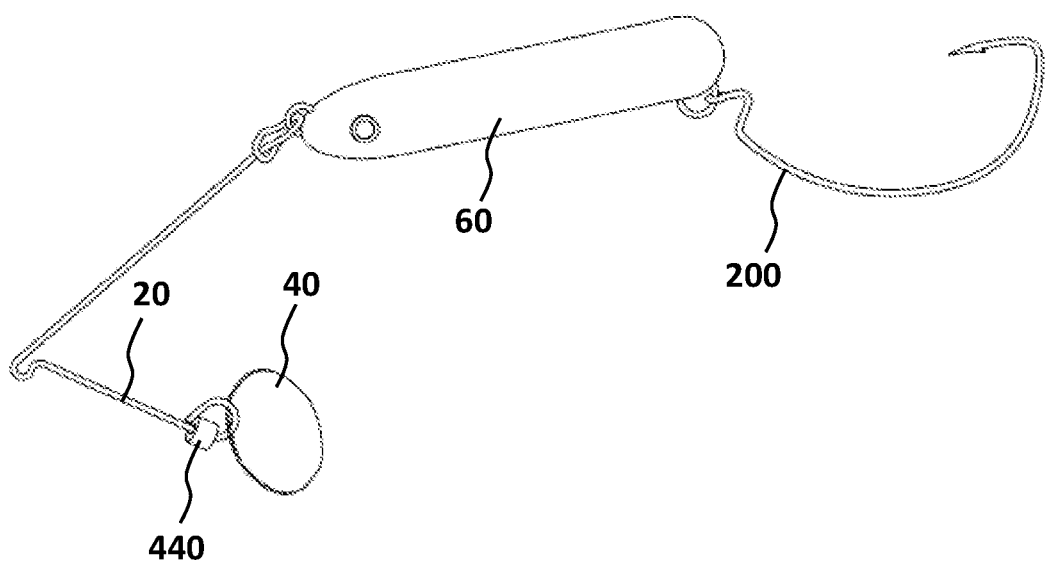
FIG. 10 is a diagrammatic perspective view of a fifth preferred embodiment wherein the weighted member is a pre-existing fishing lure.

FIG. 10 shows a fifth preferred embodiment wherein the wire form member 20 and blade member 40 are a separate attachment that an angler can assemble to a pre-existing lure, with the pre-existing lure acting as the weighted member 60 that is coupled to the wire form member 20. With this configuration, the wire form member and blade member assembly can help add a similar cyclical movement and vibration to an already-existing fishing lure.

Figure 11:
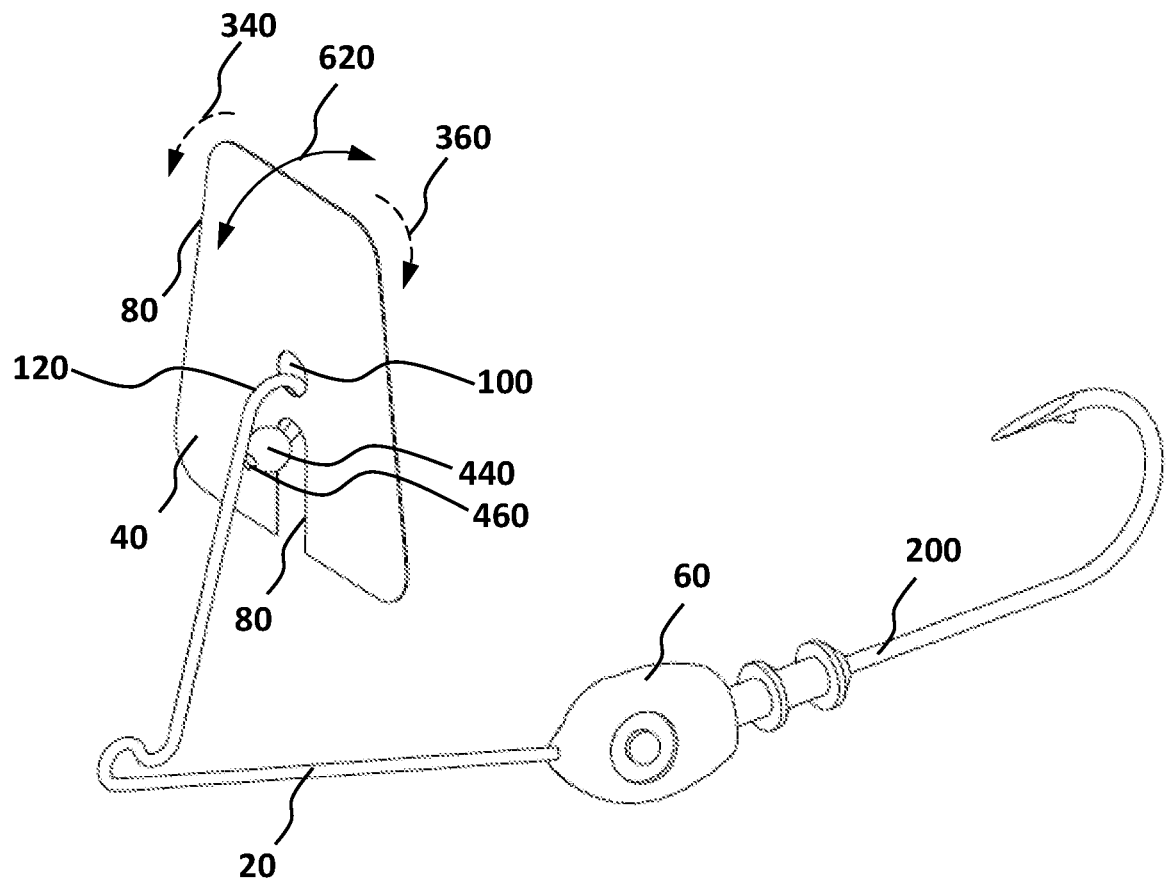
FIG. 11 is a diagrammatic perspective view of a sixth preferred embodiment wherein the blade member is substantially flat.

FIG. 11 illustrates a sixth preferred embodiment wherein the blade member 40 is substantially flat and is again comprised of an aperture 100 and a perimeter edge 80. The looped portion 120 of the wire form member 20 again passes only once through the aperture 100 of the loosely coupled blade member 40. Note that the blade member 40 is free to slide within the looped portion 120 and free to pivot in a front-to-back direction 620, with the front-to-back direction 620 being parallel with the median plane of the lure. An optional spacer member 440 is shown and can be added between the substantially flat blade member 40 and terminal end 460 of the wire form member 20, if desired. Additional spacer members can be added to produce an enhanced rattling noise when the lure is retrieved; however, it should be understood that a spacer member 440 is not a requirement. Similar to all previously-described embodiments, the blade member 40 again exhibits cyclically-alternating sideways rotations comprising a first direction rotation 340 followed by an opposite direction rotation 360, with each rotation being less than 360 degrees and each rotation corresponding with impacts between the perimeter edge 80 and the looped portion 120. With the median plane of the lure further defined as the plane that divides the lure into generally equal left and right halves, it should also be noted for this and all embodiments that at the wire form member's midway position during any side-to-side "swinging movement" oscillation cycle, either face of the blade member 40 is generally perpendicular to the median plane of the lure. Said differently, the face of the blade member 40 is not parallel to the median plane of the lure when the wire form member 20 momentarily passes through, or momentarily aligns with, the median plane during any oscillation cycle. In FIG. 11, the weighted member 60 is shown rigidly fixed to the wire form member 20; however, the weighted member 60 or hook 200 can be pivotally coupled to the wire form member 20 as shown in the earlier embodiments of FIG. 8A or FIG. 9, respectively. It should again be noted that in all preferred embodiments of this invention, the wire form member 20 passes only once through the aperture 100 of the blade member 40. That is, the wire form member 20 does not enter and then exit the same aperture 100 more than a one time. Thus, the uniqueness of this invention is again demonstrated by having a metal wire shape passing only once through only one predetermined hole in a blade, with the blade exhibiting cyclical back-and-forth rotations of less than 360 degrees, all while the lure remains in an upright orientation as it is pulled forward in water.

Figure 12:
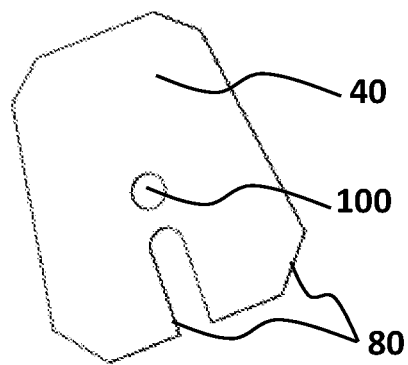
FIG. 12 is a diagrammatic perspective view of another embodiment of a blade member.

FIG. 12 details an embodiment of a flat blade member 40. Like all other blade members described previously, the blade member 40 is preferably made of metal, and the blade member 40 and has an aperture 100 and a perimeter edge 80. The perimeter edge 80 of the blade of any preferred embodiment can define any irregular shape and not be limited to ovoid, circular, oval, or other substantially round shapes. For the sake of this invention, the perimeter edge 80 of any blade member 40 is defined as the continuous edge forming a closed-shape outline or footprint of the blade member 40. The perimeter edge 80 can also be described as a border defining either the front face or rear face of the blade member 40. Additional apertures can be added to any blade member in order to help generate bubbles or provide other visually-attractive characteristics of the lure. Note that in FIGS. 11-12, the sole mounting aperture 100, which again enables the coupling of the blade member 40 and the weighted member 60 through the wire form member 20, is located generally in the center of the blade member 40 and not located along or near its bottom edge.

The weighted member can be merged with one end of the blade member, and the hook can then be loosely or rigidly coupled directly to the wire form member. Said differently, the weighted member can be rigidly fixed to the blade member such that the blade member is heavier in one area or region end as compared to an opposite area or region, while the hook can then be coupled directly to the wire form member.

There are many variations of the preferred embodiments described herein. A blade member can be made from a plastic or elastomeric material in addition to the metallic material previously described. The surface of a blade member can be coated with plastic or metallic reflective elements, such as glitter, metallic paint, or similar. Multiple blade members can be coupled to the same weighted member for additional fish attraction. At least one additional aperture can be added to a blade member, in addition to the mounting aperture shown on the various preferred embodiments. The wire form member can be any wire shape such as an elongated snap ring, elongated ring, or similar closed loop wire shape. The hook can contain the looped portion at one end such that the wire form member is merged with and becomes the hook itself. The spacer member can be flatter or elongated in shape, such as a disc, washer, tube, or sleeve-type shape. One or more rattle elements can be coupled to the wire form member or hook for generating additional underwater sounds during the lure's side-to-side movement.

While certain preferred embodiments have been described and shown in the accompanying drawings, it is to be understood that such preferred embodiments are merely illustrative of, and not restrictive on, the broad invention. It is intended that the scope of the invention be defined by the following claims and their equivalents.

What is claimed is:
1. A fishing lure comprising:
a wire form member having a looped portion;
wherein said wire form member is coupled to a weighted member;
a hook;
a blade member having a perimeter edge, said blade member having a mounting aperture, said wire form member passing only once through said mounting aperture;
wherein said blade member is solely connected to said wire form member;
wherein said wire form member exhibits a cyclical motion characterized by repeating swinging movements in opposite directions corresponding with repeating impacts between said perimeter edge and said looped portion;
wherein said swinging movements are each less than 360 degrees;
wherein said lure remains in a generally upright orientation as said lure is pulled forward under water.

2. The fishing lure in accordance with claim 1, wherein said weighted member is loosely coupled to said wire form member.

3. The fishing lure in accordance with claim 1, wherein said hook is loosely coupled to said wire form member.

4. The fishing lure in accordance with claim 1, wherein at least one spacer member is attached to said wire form member.

5. The fishing lure in accordance with claim 1, wherein said wire form member is comprised of two legs.

6. The fishing lure in accordance with claim 1, wherein said weighted member is rigidly fixed to said hook.

7. The fishing lure in accordance with claim 1, wherein said blade member is substantially flat.

8. A fishing lure comprising:
   a wire form member;
   wherein said wire form member is coupled to a hook;
   a weighted member;
   a blade member having a perimeter edge, said blade member having at least one aperture, said wire form member entering and exiting only once through only one of said at least one aperture;
   wherein said blade member has a swivel-less connection to any adjacent component of said lure;
   wherein said wire form member exhibits a cyclical swinging movement corresponding with repeating impacts of said perimeter edge with said wire form member;
   wherein said lure remains in a generally upright orientation as said lure is pulled forward in water.

9. The fishing lure in accordance with claim 8, wherein said weighted member is rigidly fixed to said hook.

10. The fishing lure in accordance with claim 8, wherein said weighted member is loosely coupled to said wire form member.

11. The fishing lure in accordance with claim 8, wherein at least one spacer member is attached to said wire form member.

12. The fishing lure in accordance with claim 8, wherein said wire form member is comprised of two legs.

13. The fishing lure in accordance with claim 8, wherein said hook is loosely coupled to said wire form member.

14. The fishing lure in accordance with claim 8, wherein said blade member is substantially flat.

15. A fishing lure comprising:
    a metal wire;
    a weighted member;
    a hook;
    a blade member having a face and at least one aperture, said metal wire only once passing through only one of said at least one aperture;
    wherein said metal wire exhibits cyclical swinging movements while said lure remains in a generally upright orientation as said lure is pulled forward under water;
    wherein said face of said blade member is generally perpendicular to the median plane of said lure as said metal wire momentarily aligns with said median plane during any of said cyclical swinging movements.

16. The fishing lure in accordance with claim 15, wherein said weighted member is loosely coupled to said metal wire.

17. The fishing lure in accordance with claim 15, wherein said weighted member is rigidly fixed to said hook.

18. The fishing lure in accordance with claim 15, wherein said hook is loosely coupled to said metal wire.

19. The fishing lure in accordance with claim 15, further comprising at least one spacer member.

20. The fishing lure in accordance with claim 15, wherein said blade member is substantially flat.

\* \* \* \* \*